United States Patent [19]

Escaravage

[11] Patent Number: 5,157,293
[45] Date of Patent: Oct. 20, 1992

[54] ELECTRIC MOTOR WITH ELECTRONIC COMMUTATION OF COMPLEX STRUCTURE

[75] Inventor: Gérard Escaravage, Valentigney, France

[73] Assignee: ECIA, France

[21] Appl. No.: 762,985

[22] Filed: Sep. 20, 1991

[30] Foreign Application Priority Data

Sep. 21, 1990 [FR] France ................. 90 11702

[51] Int. Cl.$^5$ ............ H02K 11/00; H02K 7/14; H02K 1/04
[52] U.S. Cl. .................... 310/71; 310/43; 310/67 R
[58] Field of Search .......... 310/43, 67 R, 68 R, 310/68 B, 268, 71, DIG. 3, DIG. 6

[56] References Cited

U.S. PATENT DOCUMENTS

| | | | |
|---|---|---|---|
| 4,554,491 | 11/1985 | Plunkett | 310/68 R |
| 4,682,065 | 7/1987 | English et al. | 310/67 R |
| 4,900,968 | 2/1990 | Feigel et al. | 310/43 |
| 4,910,420 | 3/1990 | Hoover et al. | 310/68 B |
| 5,023,734 | 6/1991 | Tamaki | 310/71 |
| 5,049,769 | 9/1991 | Reinhardt et al. | 310/67 R |

FOREIGN PATENT DOCUMENTS

| | | | |
|---|---|---|---|
| 2266967 | 10/1975 | France | 310/71 |
| 2651933 | 3/1991 | France | |
| 0125047 | 9/1980 | Japan | 310/71 |
| 596115 | 12/1947 | United Kingdom | |

OTHER PUBLICATIONS

Patent Abstracts of Japan, vol. 12, No. 187 (E-615)(3034) May 31, 1988, & JP-A-62 290343 (Matsushita) Dec. 17, 1987.

Primary Examiner—Steven L. Stephan
Assistant Examiner—C. LaBalle
Attorney, Agent, or Firm—Sughrue, Mion, Zinn, Macpeak & Seas

[57] ABSTRACT

The motor constituted, inter alia, by commutation means (40) with a connector (41) constituted by an insulating support (410) intended to be carried by the armature (30), and by conducting contactors (411) equipped with terminals (412) in order to receive the ends (321) of the wires (320) of the windings (32) of the armature (30) and with contacts (413) intended to make contact with each of the corresponding counter-contacts (413') of a printed circuit (421) is characterized in that the insulating support (410) carries at its periphery (4101) a median ring (4102) edged on either side with lateral borders (4103) of lesser diameter, and in that this ring (4102) is caused to form teeth (4104) whose profile (4106), at least close to the bottom (4107) of each space width (4108) which separates them, exhibits a recessed portion (4105), in that each border (4103) is provided with notches (4109) disposed in vertical line with the teeth (4104), in that the terminals (412) and the contacts (413) are joined together by central rungs (415) with two wings (416) which are each intended to be engaged into the space widths (4107) in such a manner that each wing (416) can be applied against a recessed portion (4105), and in that each rung (415) carries two marginal small bars (417) which are each intended to be engaged into the notches (4109).

6 Claims, 3 Drawing Sheets

ELECTRIC MOTOR WITH ELECTRONIC COMMUTATION OF COMPLEX STRUCTURE

BACKGROUND OF THE INVENTION

The present invention relates to electric motors with electronic commutation and is concerned more particularly with the structure of the latter.

As is known, motors with electronic commutation are composed, inter alia, of a casing which contains a wound armature and a shaft coming out from it. The commutation means of this armature, instead of being constituted by an electromagnetic device made from a commutator and brushes, are in this case an electronic device with a control module.

This type of motor usually poses a difficult problem in manufacturing, in the construction and in the assembly. In fact it is necessary to carry out the construction of the windings which must be housed in slots in the armature, then it is necessary to join the ends of the wires of the windings of this armature with the electronic circuit of the control module and, finally, it is necessary to be able to dissipate the heat from the power components of the electronic circuit of the control module.

In order to join the ends of the wires of the windings with the electronic circuit of the control module, soldering of the wire ends to terminals which are associated with the electronic circuit is usually carried out. Most of the time, taking into account the configuration of the structure of the motor, such soldering can only be done manually. In relatively conventional star connection motors, it is necessary to carry out numerous soldered joints since the armature has multiple windings and each winding requires two soldered joints. Such an operation, which is more particularly difficult to automate, is usually only done manually; it requires therefore a very high degree of skill and is time consuming. In addition, whatever may be the skill of the operator, the soldered joints are subject to contact defects. For example, these soldered joints may be so-called "dry joints", that is the flux additive of the solder flux in fact insulates the wire from the terminal instead of ensuring electrical continuity.

In order to solve another aspect of the problem, there is often used for the electronic device an insulating substrate which carries a conducting printed circuit on which the components of the electronic circuit of the control module are positioned, fixed and connected. Such a substrate, after having been equipped, is usually placed close to one of the end-flanges of the casing of the motor and, preferably, in the vicinity of its internal face. However, as this circuit comprises power components which it is necessary to cool in order to prevent their overheating, which would be destructive, it is seen to it that the insulating substrate is transpierced with apertures and that the power components are fixed directly onto the flange of the motor through these apertures; in this way this flange, by its mass and by its metallic nature, serves as a radiator in order to remove the heat produced in the power components during operation. The fact of having to split up the electronic circuit, in such a manner that several of these components are no longer on the substrate itself but mounted directly on a flange, imposes additional operations in installing, in fixing and subsequently in electrically connecting by soldering these components to the printed circuit of the substrate. It may easily be imagined that this also complicates the operations of mounting and assembly and also is a source of faults.

Another aspect of the difficulties is linked to the construction of the windings of the armature, when it is desirable to carry this out automatically and when the recesses of the armature do not permit prefabrication of these windings in order that they have only to be deposited therein. In such a case, in particular if it is wished to be able to carry this out mechanically or automatically, it is necessary to make use of a winder supplied with an articulated arm rotating about a spindle which is fed with wire by a pay-out which takes it from a reserve. This arm describes a relatively complex trajectory in order, gradually with the unwinding of the wire, to shape it into loops which are successively deposited into the recesses. In order to be able to operate in this way, it is therefore necessary that the armature is relatively uncluttered and easy to access, so as not to obstruct the travel of the rotating hinged arm, in particular by the presence of contactors which receive the ends of the wires of each winding.

One technique which makes it possible to solve some of the difficulties enumerated hereinabove is, for example, explained in the French application No. 8,911,771 filed on Sep. 8, 1989 in the name of the Applicant and published on May 15, 1991, under No. 2,651,933. However, the technique explained therein does not make it possible to carry out, automatically, winding, connecting and then assembly.

SUMMARY OF THE INVENTION

The object of the invention is to alleviate practically all these difficulties by virtue of a motor with electronic commutation of improved structure.

The subject of the invention is a motor with electronic commutation constituted, among others, by a casing with a body, by flanges intended to receive at least one bearing, by a shaft mounted in the bearing(s), by a wound armature, by commutation means with a connector constituted by an insulating support intended to be carried by the armature, and by conducting contactors equipped with terminals in order to receive the ends of the wires of the windings of the armature and with contacts intended to make contact with each of the corresponding counter-contacts of a printed circuit and with a control module made of an insulating substrate which carries this printed circuit intended to receive components, including those that are power components of electronic circuits, and which is directly applied and held in intimate contact against the internal face of a flange and in which this insulating support is mounted on this shaft, this insulating support and this shaft being supplied with a polarising slot which allows only a single orientation in rotation and fixes the latter and which also ensures the relative orientation in rotation of these contacts and counter-contacts whilst permitting a relative axial sliding of this insulating support and this shaft, where this relative axial sliding is possible, at least until the end of the operation of fixing the ends of the wires of the windings to the terminals. This motor is especially characterised in that the insulating support carries at its periphery a median ring edged on either side with lateral borders of lesser diameter, and in that this ring is caused to form teeth whose profile, at least close to the bottom of each space width which separates them, exhibits a recessed portion, in that each border is provided with notches disposed in vertical line with the teeth, in that the terminals and the contacts are joined together by central rungs with two wings which are each intended to be engaged into the space widths in such a manner that each wing can be applied against a recessed portion, and in that each rung carries two marginal small bars which are each intended to be engaged into the notches.

Other characteristics of the invention will appear on reading the description and the claims which follow and by examining the attached drawing, given solely by way of example, where:

DESCRIPTION OF A PREFERRED EMBODIMENT OF THE INVENTION

Figure 1:
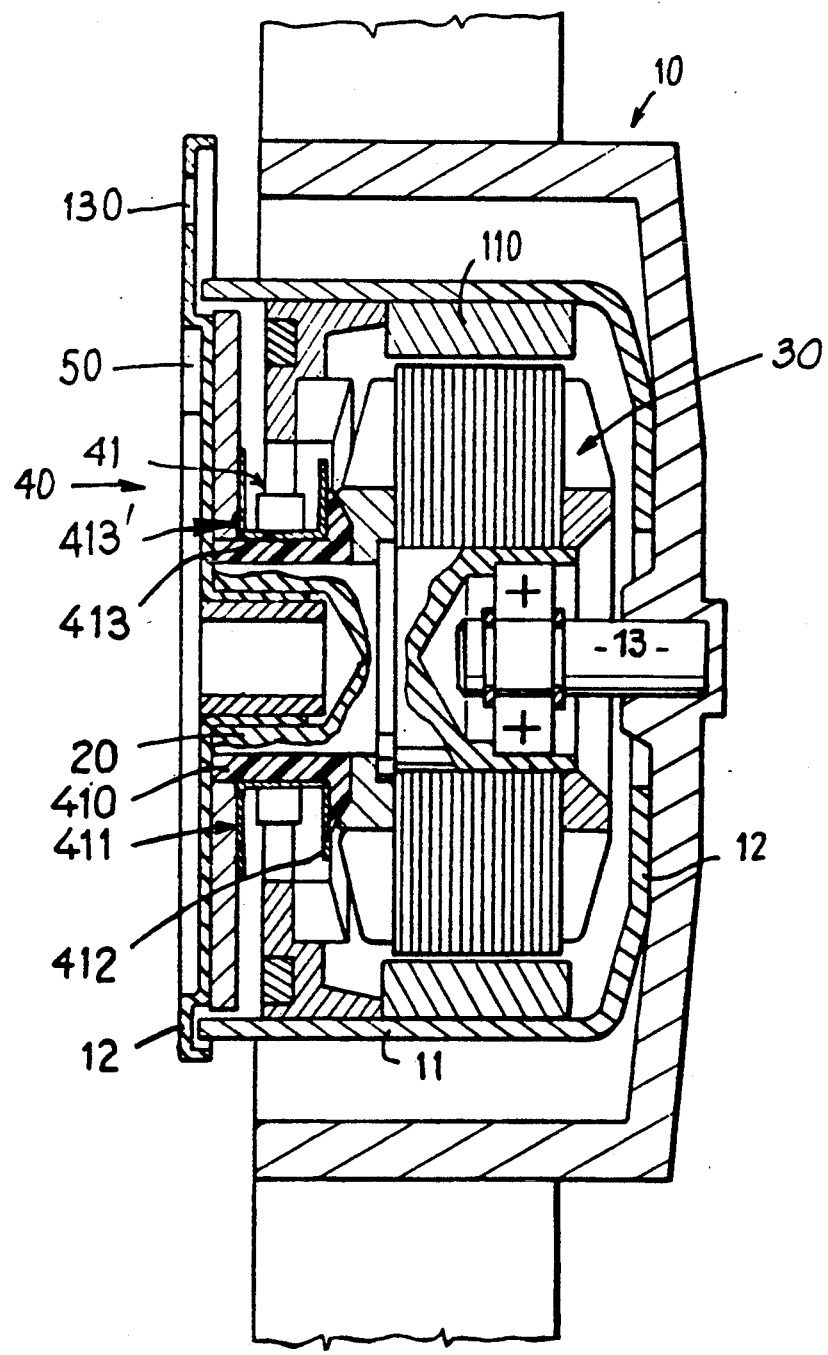
FIG. 1 is a longitudinal axial cross-section of a motor according to the invention.
Figure 2:
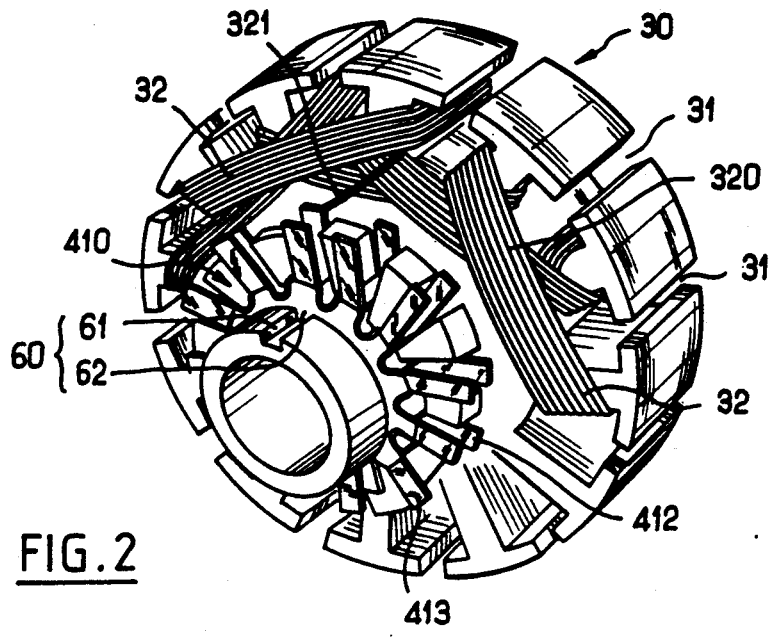
FIG. 2 is a perspective view of the finished armature ready to be joined together with the flange of FIG. 3.
Figure 3:
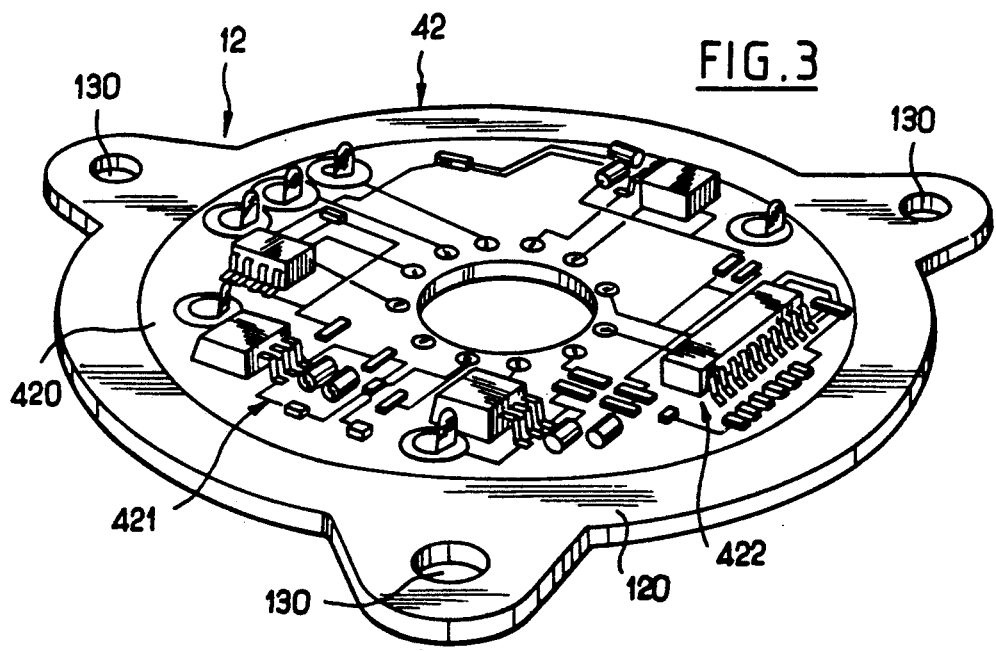
FIG. 3 is a partial perspective view of a flange equipped with its control module.
Figure 4:
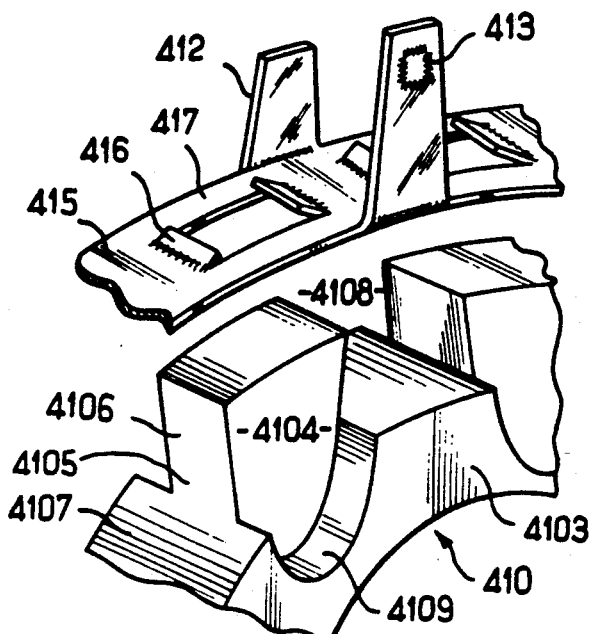
FIG. 4 is an exploded perspective partial detailed view of a connector according to the invention.
Figure 5:
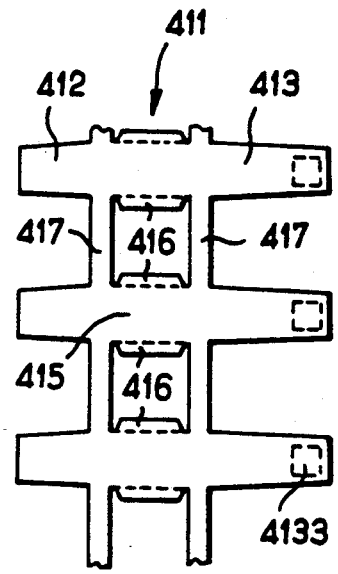
FIG. 5 is another detailed view of a constituent of this connector.
Figure 6:
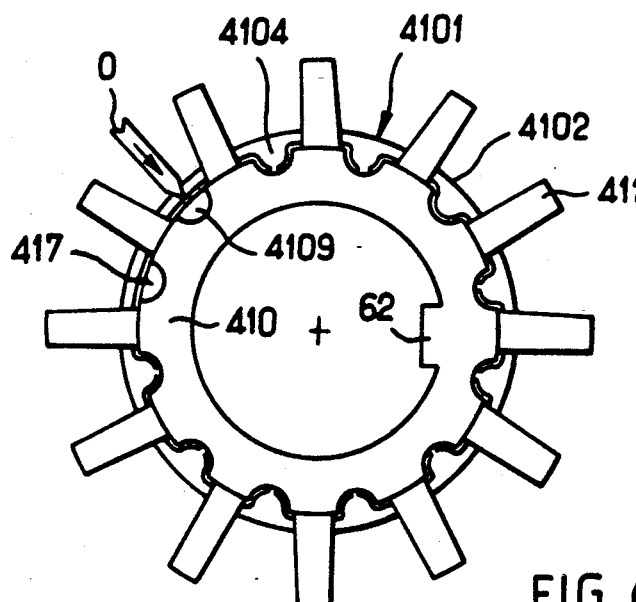
FIG. 6 is a front view of a connector by itself.

As motors with electronic commutation are well known in the technical field, there will be described only that which concerns the invention directly or indirectly. For the rest, the specialist of the technical field in question will draw from the existing conventional solutions at his disposition in order to face the particular problems by which he is confronted.

Hereinafter, the same reference number is always used for identifying an equivalent element whatever may be the embodiment.

As is seen by examining the figures, a motor with electronic commutation according to the invention comprises, among others, a casing 10, a shaft 20, a wound armature 30 associated with this shaft and commutation means 40. This motor is also equipped with a connecting device 50 for connecting it to an electrical power source, as is conventional, and also with an orienting slot 60 whose function will be understood from the following.

For the convenience of the account, each one of these constituents of a motor with electronic commutation according to the invention will be described in turn.

The casing 10 comprises an approximately cylindrical body 11 and end flanges 12 which are relatively plane. At least one of these flanges carries a bearing 13, for example a ball-bearing, only one of which is drawn as it is conventional.

This casing 10 receives the shaft 20 and the wound armature 30. This shaft 20 is supported by the bearing(s). This wound armature comprises recesses 31 in which are disposed windings 32 made from a wire 320 whose two ends 321 have to be connected to terminals. This operation is relatively conventional. In the particular embodiment shown, the shaft and the wound armature are fixed while a part of this casing is, itself, movable in rotation. As a result of this configuration, one of the flanges is not connected directly to the body so as to be able to rotate with an inductor, for example permanent magnets 110, which it carries; the other flange carries the commutation means, the armature and the shaft, and remains immobile, as it is fixed, for example, by means of bolts (not shown) engaged in holes 130.

The commutation means 40 are carried by one of the flanges 12, here by the fixed flange to which the connecting device 50 is also fixed.

As may be seen, the commutation means 40 comprise a connector 41 and a control module 42.

The connector 41 comprises an insulating support 410 on which conducting contactors 411 are placed. Each of these contactors 411 comprises at least one terminal 412 for receiving one of the ends 321 of the wires 320 of the windings 32 of the armature, and a contact 413 intended to come into contact with a corresponding counter-contact 413' of a printed circuit in order to ensure the electrical continuity, as will be understood in the following. This connector forms, as it were, a multiple-pin plug. It is clear that contacts and counter-contacts may be inverted or switched around completely or partially.

The control module 42 is made of an insulating substrate 420 which carries the pattern of a conducting printed circuit 421 intended to receive components, including the power components of an electronic circuit 422. As may be seen, this substrate 420 is applied directly against the internal face 120 of a flange 12 and is held in intimate contact with the latter in such a manner that the printed circuit and the components are showing. The insulating substrate is, for example, a thin sheet of polyimide resin, one of whose faces is covered with a layer of copper from which the conductive network of the printed circuit including where appropriate the counter-contacts 413', is made to appear by photoetching and the other face of which is adhesively bonded to the face of the flange.

When the construction of the windings 32 is carried out with a mechanical winder, for example a robotically controlled one, it is necessary that its arm, articulated and turning according to a spindle, can follow at least two successive recesses 31 in order to deposit therein the turns of wire 320. For constructing the windings, it is therefore necessary that this arm should not be obstructed in its travel, in particular by the contactors 411 which receive the ends 321 of the wire 320 to which they will be soldered, brazed, hot-crimped or electrically connected by any other conventional existing manner.

In order to permit, at least momentarily, this disengagement of the armature 30 and to facilitate the automatic construction of the windings 32, a connector 41 is used which comprises an insulating support 410 in the form of a ring which is slipped over the shaft 20 so as to be able to slide thereon but without being able to rotate in relation to the latter. In order to do this, an orienting slot 60 is used which allows only a single relative orientation in rotation and fixes the latter whilst permitting a relative axial sliding of this insulating support 410 and this shaft 20. This orienting slot thus ensures a one-to-one registration of the contactors with the particular windings and also a registration which will make it possible subsequently to place the contacts 413 and counter-contacts 413' into correct correspondence. This orienting slot 60 is made of complementary male elements 62 and female elements 61, for example of the tongue-and-groove type. In the embodiment illustrated, the groove is machined on the shaft 20, for example in the form of an axial peripheral slot while the tongue is carried by the insulating support 410 configured as a ring, for example in the form of a radial salient protuberance on the internal periphery and whose profile of the cross-section is complementary to that of the cross-section of this slot.

It is clear that this configuration of the orienting slot is not the only one utilisable. This orienting slot may utilise the number of pole-pairs of the motor and their possible symmetries in order to pull out a portion of them in order, for example, not to use a uniform distribution of the contacts and counter-contacts or a regular arrangement of male and female contacts and counter-contacts.

As may be observed in the figures of the drawing, the insulating support 410 has a toroidal configuration. The insulating support 410 carries on its external periphery 4101 a median ring 4102 which is edged, on either side, by lateral borders 4103. The diameter pertaining to each of the borders 4103 is less than that of the ring 4102. The ring 4102 is made to form teeth 4104 whose profiles 4106, at least close to the bottom 4107 of each space width 4108 which separates them, exhibit a recessed portion 4105. Each of the two borders 4103 is provided with notches 4109 disposed vertically in line with the teeth 4104. As may be observed, the minimum distance between two opposing profiles 4106 which are separated by a space width 4108 is less than the minimum distance between two opposing recessed portions 4105 which are separated by this same space width.

The teeth and notches are or are not regularly distributed; however, they are preferably equi-distant.

As may be seen, the terminals 412 and the contacts 413 are joined together by central rungs 415 each with two wings 416, and they carry two marginal small bars 417. As may be observed, in the initial state the terminals 412 and the contacts 413 together with their rungs 415 and their small bars 417 form a continuous strip where the terminals and contacts form on each side a kind of comb and the rungs form a kind of ladder in the middle.

Each rung 415 is equipped with two wings 416 which are intended to be engaged in a space width 4108 in such a manner that each wing 416 can be applied against a recessed portion 4105 which faces it. The small bars 417 are, themselves, each intended to be engaged in a notch 4109 which is contiguous with the wing.

As may be observed, before engagement of a rung 415 in a space width 4108 the width of the wings 416 is preferably less than the minimum distance between two opposing profiles 4106 which are separated by a space width 4108. After engagement, this width is at least equal to the minimum distance between two opposing recessed portions 4105 which are separated by a space width 4108.

As may be observed, before engagement in the notches 4109 the small bars 417 are convex while after engagement in the notches 4109 they are concave.

As may be observed, initially, when the small bars 4107 are convex, they ensure mechanical and electrical continuity between two successive terminals 412 and two successive contacts 413. Subsequently, when the small bars 417 are concave, they no longer ensure this electrical continuity at least and, preferably, they no longer ensure either this electrical continuity or this mechanical continuity.

When the wings 416 are engaged in the corresponding recessed portions 4105 they contribute to the radial retention of the terminals 412 and plots 413 on the insulating support 410. When the small bars 417 are engaged in the notches 4109 they contribute to the axial retention of the terminals 412 and contacts 413 on the insulating support 410.

So as to ensure a good electrical contact between the contacts 413 and the counter-contacts 413', the contacts 413 are bent with an angle less than 90° in such a way as to keep a certain flexibility in them. Preferably and if necessary, in order to make the electrical continuity perfect, the contacts 413 are each provided with a depression 4133 which is intended to receive a conductive paste suitable for coming into contact with the counter-contacts 413'.

The initially continuous strip in the form of a double-combed ladder, which the terminals 412 and the contacts 413 together with the rungs 415 and the small bars 417 constitute, is, for example, first of all cut out to the length of the circumference of the bottoms of the space widths against which the rungs will rest. Subsequently, this strip is inserted into the space widths and bent around one by one in order to marry with the bottoms of the space widths. The wings of the rungs are then deployed in such a manner as to penetrate into the recessed portions. Simultaneously or subsequently, the small bars, which had therefore a convex configuration because of the bending around of the strip, are deformed in order to be made concave and to interrupt simultaneously the electrical continuity and also, if necessary, to interrupt the mechanical continuity by breaking. To do this the small bars are preferably frangible.

These small bars therefore contribute with the wings to the immobilisation of the contacts and terminals: the small bars confine laterally the roots of the teeth of the median ring and the wings are fitted into the recessed portions of the profiles of the teeth.

In the embodiment illustrated, the recessed portions give the space widths and the teeth a dovetail configuration.

Depending on the nature of the material from which the initial strip is made and on the precise profile of the teeth, the rungs may be engaged in the space widths and remain therein simply by elastic deformation of the wings. If the material does not have sufficient elasticity, the wings are deployed mechanically with the help of an appropriate tool 0.

Preferably only the terminals are folded before winding the armature, while the contacts are folded subsequently in order not to interfere with the progress of the arm of the winder.

The insulating support is constructed, for example, by moulding a synthetic material.

All the important aspects of the solution provided by the invention are included as the connector 41 ensures by itself the junction between the windings of the armature 30 and the commutation means 40.

It is understood therefore that the connector according to the invention acts as an interface between the fastening points of the ends of the wires of the windings, during the process of winding, and the electronic circuit, whilst guaranteeing an electrical link and an angular registration of the inputs and outputs of the windings in relation to the electronic circuit because of the existence of the orienting slot which allows an axial displacement, at least momentarily, of the insulating support in order to permit the displacements of the arm of a winder.

By virtue of the invention, it is possible to manufacture, on an industrial scale and automatically, an electric motor with electronic commutation. Because of the existence of the orienting slot, it is also possible to ensure the sheet-metal flats of the armature are placed in register in order to promote their correct stacking in the right orientation. The insulating support is put into position and initially held separated from the pile of metal sheets during the construction of the windings. When the latter are finished, the ends of the wire of each of them are connected electrically to the terminals by soldering, for example with a tin flux, electrical welding or in any other manner. The insulating support is then pushed back against the metal sheets of the armature so as to reduce the bulk of the assembly. The solution according to the invention makes it possible to utilise a shaft, of which the length of the salient portion does not exceed approximately half of its external diameter, while for conventional motors this length usually exceeds this diameter by approximately one and a half times. It is sufficient then to bring the wound armature up to the control module equipped with its counter-contacts while still utilising the slot: this permits the contacts and counter-contacts to be aligned and to be engaged one against the other in a unique way and without possible hesitation by virtue of the role played by the polarising slot. It is understood therefore that this last operation may also be done automatically with the help of a robot or a programmable automatic device.

The significance of a motor with electronic commutation according to the invention is therefore perceived, as it permits industrial-scale manufacture which is largely automated.

An electric motor with electronic commutation of complex structure according to the invention is particularly well suited for fans of the type of those used for example in automobiles. In such a case, the casing with its body are constituted by a "bowl" associated with the impeller of the fan which is put on over the rotor of the motor. This impeller is fitted onto the shaft which serves to join together the assembly.

I claim:

1. A motor with electronic commutation, comprising:
   a casing (10) with a body (11);
   flanges (12) having an internal face and adapted to receive at least one bearing (13);
   a shaft (20) mounted in the bearing;
   an armature (30) carrying windings (32) of wires (320) having ends (321);
   commutation means (40) with a connector (41) constituted by an insulating support (410) adapted to be carried by the armature (30);
   a printed circuit (421) for receiving components; and conducting contactors (411) equipped with terminals (412) in order to receive said wire ends (321), with contacts (413) adapted to make contact with respective ones of corresponding counter-contacts (413') of said printed circuit (421) and with a control module (42) made of an insulating substrate (420) which carries said printed circuit (421) for receiving components including those that are power components of electronic circuits (422), and which is directly applied and held in intimate contact against said internal face of a flange (12), and in which said insulating support (410) is mounted on said shaft (20), said insulating support (410) and said shaft (20) being provided with a polarising slot (60) which allows only a single orientation in rotation and fixes the latter and which also ensures the relative orientation in rotation of said contacts (413) and counter-contacts (413') while permitting a relative axial sliding of said insulating support (410) and said shaft (20), where this relative axial sliding is possible, at least until an end of an operation of fixing the wire ends (321) to the terminals (412); and wherein said insulating support (410) carries at its periphery (4101) a median ring (4102) edged on either side with lateral borders (4103) of lesser diameter;

wherein said ring (4102) is provided with teeth (4104) whose profile (4106), at least close to a bottom (4107) of each space width (4108) which separates them, exhibits a recessed portion (4105);

wherein each of said borders (4103) is provided with notches (4109) disposed in vertical line with said teeth (4104);

wherein said terminals (412) and said contacts (413) are joined together by central rungs (415) with two wings (416) which are each adapted to be engaged into the space widths (4107) in such a manner that each of said wings (416) can be applied against a recessed portion (4105); and wherein each rung (415) carries two marginal small bars (417) which are each adapted to be engaged into the notches (4109).

2. Motor according to claim 1, wherein the width of the wings (416) is variable so that, before engagement of a rung (415) in a space width (4107) the width of said rings is less than the minimum distance between two opposing profiles (4106) which are separated by a space width (4108), and so that the width of said wings after engagement is at least equal to the minimum distance between two opposing recessed portions (4105) which are separated by a space width (4107) so as to contribute to retention of said terminals and contacts.

3. Motor according to either of claims 1 or 2, wherein the shape of said small bars (417) is variable so that said small bars are convex before engagement into the notches (4109) and are concave after engagement, whereby, when said small bars are convex, they ensure mechanical and electrical continuity between two successive terminals (412) and two successive contacts (413), and, when said small bars are concave, they no longer ensure said electrical continuity at least and contribute to said retention of said terminals and contacts.

4. Motor according to claim 1 characterised in that an end of the contacts (413) is bent at an angle less than 90° in such a manner as to keep their flexibility in order to ensure a good electrical contact with the counter-contacts (413').

5. Motor according to claim 4, characterized in that the folded extremity of a contacts (413) is provided with a depression (4133) for receiving a conductive paste suitable for coming into contact with the counter-contacts (413').

6. Motor according to claim 1, characterised in that the terminals (412), contacts (413), rungs (415) and small bars (417) are in the form of a continuous strip.

* * * * *